United States Patent
Yourkowski et al.

(10) Patent No.: US 8,823,554 B2
(45) Date of Patent: Sep. 2, 2014

(54) MANAGING A PLURALITY OF RADIO FREQUENCY IDENTIFICATION DEVICES

(75) Inventors: Swanee Yourkowski, Burien, WA (US);
William P. Coop, Buckley, WA (US);
Rebecca J. Shore, Seattle, WA (US);
Kevin Yong Ung, Bellevue, WA (US);
Robert Lee Avery, Woodinville, WA (US); Arun Ayyagari, Seattle, WA (US)

(73) Assignee: The Boeing Company, Chicago, IL (US)

(*) Notice: Subject to any disclaimer, the term of this patent is extended or adjusted under 35 U.S.C. 154(b) by 456 days.

(21) Appl. No.: 12/964,048

(22) Filed: Dec. 9, 2010

(65) Prior Publication Data

US 2012/0146815 A1 Jun. 14, 2012

(51) Int. Cl.
*G08B 21/00* (2006.01)
*G06Q 10/08* (2012.01)
*G06Q 50/30* (2012.01)
*G06Q 10/06* (2012.01)
*B64C 13/20* (2006.01)

(52) U.S. Cl.
CPC ............... *G06Q 10/08* (2013.01); *G06Q 50/30* (2013.01); *G06Q 10/06* (2013.01); *B64C 13/20* (2013.01)
USPC ...... 340/945; 340/572.1; 340/5.92; 340/10.1; 340/505; 340/539.1; 235/385; 702/184

(58) Field of Classification Search
CPC ....... G06Q 10/08; G06Q 50/30; G06Q 10/06; B64F 5/0045; G06K 7/008; B64C 13/20; B64D 2045/0035
USPC ............. 340/572.1, 5.92, 945, 10.1, 10.41, 340/10.51, 505, 514, 517, 539.1, 679; 235/385, 462.13, 375; 702/184
See application file for complete search history.

(56) References Cited

U.S. PATENT DOCUMENTS

| | | | |
|---|---|---|---|
| 5,959,568 A * | 9/1999 | Woolley | 342/42 |
| 6,043,746 A | 3/2000 | Sorrells | |
| 6,381,541 B1 * | 4/2002 | Sadler | 701/301 |
| 6,611,198 B1 * | 8/2003 | Geiszler et al. | 340/10.41 |
| 6,799,187 B2 | 9/2004 | Beggs et al. | |
| 6,812,841 B2 | 11/2004 | Heinrich et al. | |

(Continued)

FOREIGN PATENT DOCUMENTS

| CN | 101226602 A | 7/2008 |
|---|---|---|
| CN | 101226603 A | 7/2008 |
| WO | WO2012078234 A1 | 6/2012 |

OTHER PUBLICATIONS

PCT search report dated Feb. 13, 2012 regarding application PCT/US2011/053363, filing date Sep. 27, 2011, applicant's reference 10-0752PCT, applicant The Boeing Company 8 pages.

(Continued)

*Primary Examiner* — Hoi Lau
(74) *Attorney, Agent, or Firm* — Yee & Associates, P.C.

(57) ABSTRACT

A method and apparatus for managing identification devices on an aircraft. An occurrence of an event is identified using information for a plurality of identification devices. Each of the plurality of identification devices is associated with a plurality of components on the aircraft. The information for the plurality of identification devices comprises data received from the plurality of identification devices and specification data for the plurality of identification devices. In response to identifying the occurrence of the event, a number of operations for the plurality of identification devices are initiated.

24 Claims, 8 Drawing Sheets

(56) References Cited

U.S. PATENT DOCUMENTS

| | | | |
|---|---|---|---|
| 6,842,121 B1 | 1/2005 | Tuttle | |
| 6,859,757 B2* | 2/2005 | Muehl et al. | 702/184 |
| 6,965,816 B2* | 11/2005 | Walker | 701/16 |
| 6,995,655 B2* | 2/2006 | Ertin et al. | 340/10.2 |
| 7,030,760 B1* | 4/2006 | Brown | 340/568.1 |
| 7,047,159 B2* | 5/2006 | Muehl et al. | 702/184 |
| 7,064,668 B2 | 6/2006 | Porad | |
| 7,341,197 B2 | 3/2008 | Muehl et al. | |
| 7,545,274 B2 | 6/2009 | Coop | |
| 7,546,176 B2 | 6/2009 | Botvinnik et al. | |
| 7,551,086 B2* | 6/2009 | Coop et al. | 340/572.1 |
| 7,589,636 B2 | 9/2009 | Ayyagari et al. | |
| 7,598,868 B2 | 10/2009 | Lee et al. | |
| 7,696,751 B2 | 4/2010 | Molyneaux et al. | |
| 7,698,148 B2* | 4/2010 | Lavu et al. | 705/1.1 |
| 7,855,643 B2 | 12/2010 | Tuttle | |
| 8,026,631 B2* | 9/2011 | Stoner et al. | 307/9.1 |
| 8,081,080 B2* | 12/2011 | Henriot et al. | 340/572.7 |
| 8,097,836 B2 | 1/2012 | Raterman | |
| 8,209,300 B2* | 6/2012 | Malkowicz et al. | 707/689 |
| 8,231,062 B1 | 7/2012 | Ayyagari et al. | |
| 8,380,385 B2* | 2/2013 | Yukawa et al. | 701/24 |
| 2004/0020994 A1* | 2/2004 | Muehl et al. | 235/492 |
| 2005/0044180 A1* | 2/2005 | Lamers et al. | 709/218 |
| 2005/0288947 A1 | 12/2005 | Mallonee et al. | |
| 2006/0086790 A1* | 4/2006 | Sloan et al. | 235/384 |
| 2006/0144997 A1* | 7/2006 | Schmidt et al. | 244/100 R |
| 2007/0063847 A1* | 3/2007 | Lee et al. | 340/572.1 |
| 2007/0114280 A1* | 5/2007 | Coop et al. | 235/385 |
| 2007/0156496 A1 | 7/2007 | Avery et al. | |
| 2007/0241908 A1* | 10/2007 | Coop | 340/572.8 |
| 2007/0266782 A1 | 11/2007 | Bartz et al. | |
| 2007/0290803 A1* | 12/2007 | Ayyagari et al. | 340/10.1 |
| 2008/0186138 A1 | 8/2008 | Butler et al. | |
| 2009/0132595 A1* | 5/2009 | Yang et al. | 707/104.1 |
| 2009/0322488 A1* | 12/2009 | Kanagala et al. | 340/10.3 |
| 2009/0322551 A1* | 12/2009 | Kanagala et al. | 340/825.72 |
| 2010/0079237 A1* | 4/2010 | Falk et al. | 340/5.8 |
| 2010/0102934 A1 | 4/2010 | Guichard | |
| 2010/0156606 A1 | 6/2010 | Gold | |
| 2010/0156650 A1* | 6/2010 | Stern | 340/657 |
| 2012/0026016 A1* | 2/2012 | Mitchell et al. | 340/945 |
| 2012/0044092 A1* | 2/2012 | Shore et al. | 340/945 |

OTHER PUBLICATIONS

Xu et al., "Aircraft Part Control System," U.S. Appl. No. 13/152,806, filed Jun. 3, 2011, 55 Pages.

Non-final office action dated Oct. 17, 2013 regarding U.S. Appl. No. 13/152,806, 16 pages.

Notice of Allowance dated Mar. 18, 2014, regarding U.S. Appl. No. 13/152,806, 10 pages.

* cited by examiner

MANAGING A PLURALITY OF RADIO FREQUENCY IDENTIFICATION DEVICES

BACKGROUND INFORMATION

1. Field

The present disclosure relates generally to managing identification devices and, in particular, to managing radio frequency identification devices. Still more particularly, the present disclosure relates to a method and apparatus for managing radio frequency identification devices for an aircraft.

2. Background

Aircraft include various types of components. These components may include, for example, without limitation, overhead stowage bins, seats, food carts, safety devices, doors, windows, sections of the aircraft, computers in the cockpit of the aircraft, engines, control surfaces, spars, and/or other suitable types of components in the aircraft.

Keeping track of the different components installed in an aircraft may take more time and/or effort than desired as the number of components in the aircraft increases. Further, over time, operations, such as, for example, maintenance, repair, replacement, inspection, and/or other suitable types of operations may need to be performed for these components. These types of operations may also make keeping track of the different components more time-consuming and more difficult than desired.

Currently, one system for keeping track of these components includes using automated identification technology (AIT). Automated identification technology is a group of technologies for storing and transferring data. In particular, automated identification technology includes devices that allow data to be captured, aggregated, and/or transferred from the devices. These devices may be referred to as identification devices. Automated identification technology (AIT) is increasingly being introduced into aircraft.

For example, automated identification technology in an aircraft may include a number of identification devices that are used to mark or "tag" components in the aircraft. The identification devices used to tag the different components may include, for example, without limitation, radio frequency identification (RFID) tags, magnetic strips, bar codes, optical memory cards, and/or other suitable types of devices.

As the number of identification devices used in an aircraft increases, managing information about the identification devices may become more difficult and more time-consuming than desired.

Therefore, it would be advantageous to have a method and apparatus that addresses one or more issues discussed above, as well as possibly other issues.

SUMMARY

In one advantageous embodiment, a method is provided for managing identification devices on an aircraft. An occurrence of an event is identified using information for a plurality of identification devices. Each of the plurality of identification devices is associated with a plurality of components on the aircraft. The information for the plurality of identification devices comprises data received from the plurality of identification devices and specification data for the plurality of identification devices. In response to identifying the occurrence of the event, a number of operations for the plurality of identification devices are initiated.

In another advantageous embodiment, an apparatus comprises a plurality of radio frequency identification devices and a computer system. The plurality of radio frequency identification devices is associated with a plurality of components on an aircraft. The computer system is configured to identify an occurrence of an event using information for a plurality of identification devices. Each of the plurality of identification devices is associated with a plurality of components on the aircraft. The information for the plurality of identification devices comprises data received from the plurality of identification devices and specification data for the plurality of identification devices. The computer system is configured to initiate a number of operations for the plurality of identification devices in response to identifying the occurrence of the event.

In yet another advantageous embodiment, a method is provided for managing radio frequency identification devices on an aircraft. An occurrence of an event is identified using information for a plurality of radio frequency identification devices. Each of the plurality of radio frequency identification devices is associated with a plurality of components on the aircraft. The information for the plurality of radio frequency identification devices comprises data received from the plurality of radio frequency identification devices and specification data for the plurality of radio frequency identification devices. In response to identifying the occurrence of the event, a number of operations for the plurality of radio frequency identification devices are initiated.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
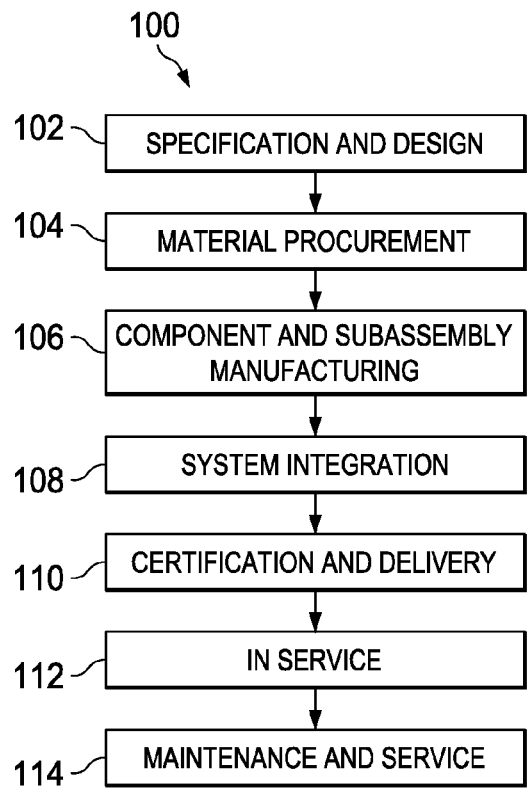
FIG. 1 is an illustration of an aircraft manufacturing and service method in accordance with an advantageous embodiment.
Figure 2:
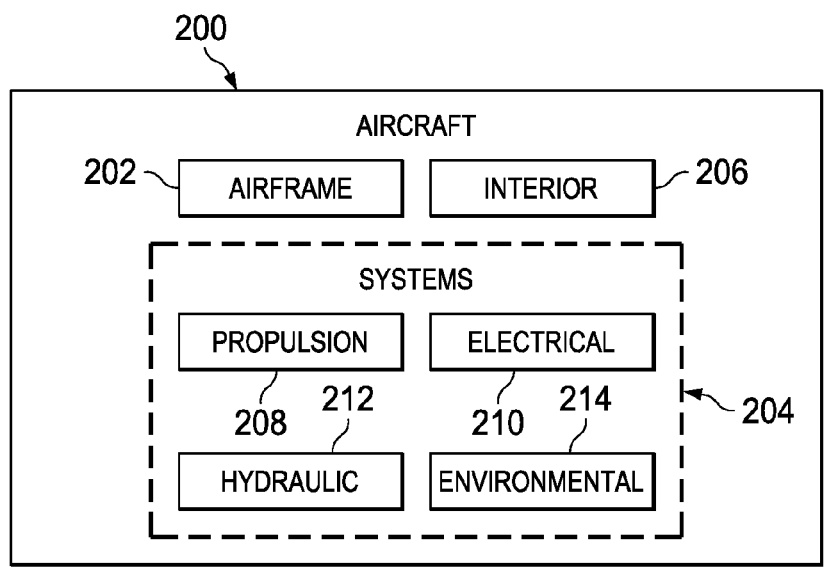
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2.

Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that managing information about identification devices in an aircraft may take more time and/or effort than desired as the number of identification devices increases. These identification devices may be, for example, radio frequency identification tags that form a network and are attached to components in the aircraft.

The different advantageous embodiments recognize and take into account that it may be desirable to have a system for managing information about the radio frequency identification tags and making decisions based on this information. For example, the different advantageous embodiments recognize and take into account that it may be desirable to have a system that makes decisions and/or generates alerts regarding the maintenance, repair, and/or replacement of the radio frequency identification devices based on information about the radio frequency identification devices.

Thus, the different advantageous embodiments provide a method and apparatus for managing identification devices on an aircraft. An occurrence of an event is identified using information for a plurality of identification devices. Each of the plurality of identification devices is associated with a plurality of components on the aircraft. The information for the plurality of identification devices comprises data received from the plurality of identification devices and specification data for the plurality of identification devices. In response to identifying the occurrence of the event, a number of operations for the plurality of identification devices are initiated.

Figure 3:
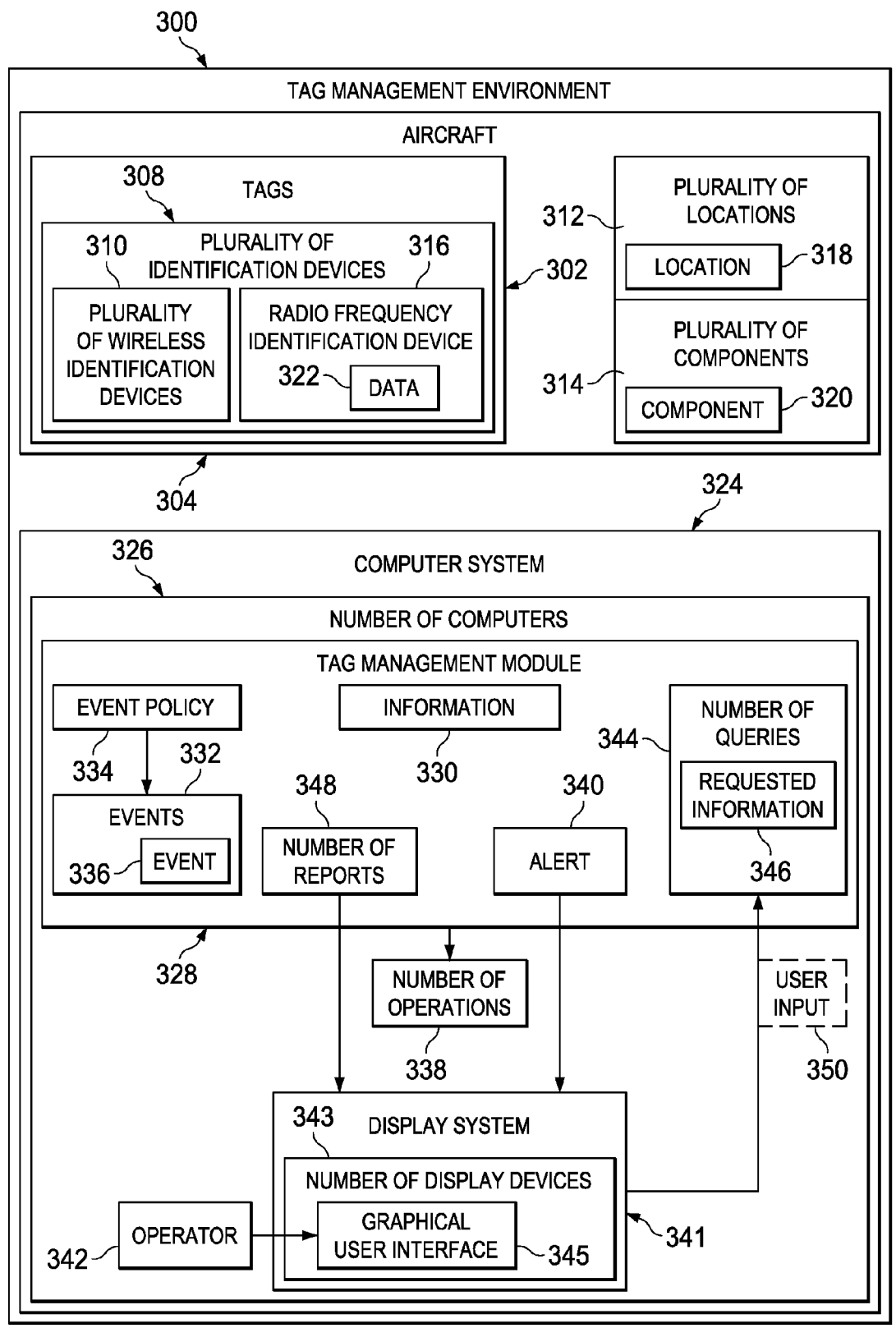
FIG. 3 is an illustration of a tag management environment in accordance with an advantageous embodiment.

With reference now to FIG. 3, an illustration of a tag management environment is depicted in accordance with an advantageous embodiment. In these illustrative examples, tag management environment 300 is an example of one environment in which tags 302 for aircraft 304 may be managed. Aircraft 304 may be an example of one implementation for aircraft 200 in FIG. 2.

Tags 302 are devices configured to store data and allow data to be transferred from the tags. For example, without limitation, tags 302 may include radio frequency identification tags, magnetic strips, bar codes, optical memory cards, and/or other suitable types of devices.

In these illustrative examples, tags 302 take the form of plurality of identification devices 308. Plurality of identification devices 308 is devices configured to store data and transmit data. Plurality of identification devices 308 may not include, for example, bar codes, magnetic strips, and other devices that are not configured to transmit data.

Further, plurality of identification devices 308, in these illustrative examples, is plurality of wireless identification devices 310. A wireless identification device is a device configured to store data and transmit data wirelessly using, for example, without limitation, radio frequency signals, optical signals, and/or other suitable types of wireless signals. Radio frequency identification devices are examples of wireless identification devices.

In these illustrative examples, plurality of identification devices 308 is attached to plurality of locations 312 on aircraft 304. Plurality of locations 312 includes locations that are on the outside of aircraft 304, on the inside of aircraft 304, and/or on a component on aircraft 304.

For example, plurality of locations 312 may be locations on plurality of components 314 on aircraft 304. In this manner, plurality of identification devices 308 is associated with plurality of components 314.

A first component may be considered to be associated with a second component by being secured, attached, bonded, fastened, and/or mounted to the second component. Further, the first component may be associated with the second component by being connected to the second component in some other suitable manner. Still further, the first component also may be connected to the second component by using a third component. The first component may also be considered to be associated with the second component by being formed as part of and/or an extension of the second component.

A component in plurality of components 314 on aircraft 304 may include, for example, without limitation, a seat, a wall, a fuselage, a control surface, a flap, a spoiler, a window, a serving tray, a fastener, a food cart, a vent, an air duct, a wall panel, a hallway, a placard attached to a wall, and/or some other suitable type of component on aircraft 304.

In these illustrative examples, radio frequency identification device 316 is an example of one of plurality of identification devices 308. Radio frequency identification device 316 may be attached to location 318 in plurality of locations 312. Location 318 is on component 320 in plurality of components 314. In this manner, radio frequency identification device 316 is attached to component 320. Radio frequency identification device 316 may be attached to location 318 on component 320 to identify component 320 and distinguish component 320 from other components on aircraft 304.

In some illustrative examples, radio frequency identification device 316 may be attached to location 318 on component 320 to identify a portion of aircraft 304 in which component 320 is present. For example, component 320 may be a wall inside the passenger cabin of aircraft 304. Location 318 may be at an aft portion of the wall. Radio frequency identification device 316 may be attached to the location on the aft portion of the wall to identify the aft portion of the passenger cabin.

Radio frequency identification device 316 may be attached to location 318 on component 320 before or after component 320 is installed on aircraft 304. For example, in some illustrative examples, radio frequency identification device 316 may be attached to location 318 on component 320 when component 320 is still in a warehouse or in inventory.

In these depicted examples, each of plurality of identification devices 308 stores data 322 about the identification device. Data 322 may be obtained from plurality of identification devices 308 for processing by computer system 324.

As depicted, computer system 324 takes the form of number of computers 326. Number of computers 326 may be associated with aircraft 304. Number of computers 326 may be associated with aircraft 304 in a number of different ways. In these illustrative examples, number of computers 326 may be associated with aircraft 304 by being located on aircraft 304.

In some illustrative examples, at least a portion of number of computers 326 may be in a location remote to aircraft 304. A portion may be one or some of number of computers 326. At least a portion may be one, some, or all of number of computers 326. As one illustrative example, a portion of number of computers 326 may be located remote to aircraft 304 and configured to communicate with another portion of number of computers 326 on aircraft 304 using wireless communications links.

Additionally, a portion of number of computers 326 may be handheld computers. For example, a portion of number of computers 326 may be handheld readers configured to obtain data 322 from plurality of identification devices 308. In particular, the portion of number of computers 326 may be configured to receive data 322 that is transmitted by plurality of identification devices 308.

As one illustrative example, operators may use handheld readers to obtain data 322 from plurality of identification devices 308 periodically. Data 322 may be obtained from an identification device in plurality of identification devices 308 when the identification device is operating within selected parameters. In other words, an identification device may not be able to transmit data 322 when the device is not working properly, does not have enough processing resources, is unable to identify the handheld reader, and/or has some other type of issue.

In these illustrative examples, data 322 for plurality of identification devices 308 may be obtained during one of component and subassembly manufacturing 106, system integration 108, certification and delivery 110, in service 112, and maintenance and service 114 in FIG. 1, as well as other processes for aircraft 304.

As depicted, tag management module 328 is configured to receive and process data 322 from plurality of identification devices 308. Tag management module 328 is implemented in one or more of number of computers 326. In particular, tag management module 328 comprises at least one of hardware components, software components, and firmware components.

In these depicted examples, tag management module 328 processes data 322 and stores the processed data in information 330. Tag management module 328 uses information 330 to manage plurality of identification devices 308. Information 330 may also include, for example, without limitation, information about plurality of locations 312 and/or plurality of components 314, information about which identification device is attached to which location, information about dates and/or times for when data 322 is received from plurality of identification devices 308, and/or other suitable types of information.

Tag management module 328 processes information 330 to identify occurrences of events 332 for plurality of identification devices 308 using event policy 334. Event policy 334 includes a number of rules, criteria, and/or guidelines for identifying when events 332 occur based on information 330.

As one illustrative example, event policy 334 may indicate that event 336 occurs when an amount of memory remaining for radio frequency identification device 316 is less than a selected threshold. As another illustrative example, event policy 334 may indicate that event 336 occurs when a period of time in which data 322 has been not been received from radio frequency identification device 316 exceeds a selected threshold. Further, in yet another illustrative example, event policy 334 may indicate that event 336 occurs when a version of radio frequency identification device 316 expires.

In these illustrative examples, tag management module 328 initiates number of operations 338 in response to identifying the occurrence of event 336. Number of operations 338 may include, for example, without limitation, replacing, removing, repairing, inspecting, and/or adding an identification device.

Number of operations 338 may also include generating a number of alerts, reports, notifications, and/or queries for plurality of identification devices 308. In some illustrative examples, tag management module 328 may initiate an operation in number of operations 338 by generating a notification that indicates the operation to be performed to a user.

As one illustrative example, in response to identifying the occurrence of event 336, tag management module 328 generates alert 340. Alert 340 may be a visible and/or audible alert. In these illustrative examples, tag management module 328 displays alert 340 on display system 341 in computer system 324.

As depicted, display system 341 may comprise number of display devices 343. Number of display devices 343 may include, for example, without limitation, computer monitors, display screens, touch screens, and/or other suitable types of display devices. Number of display devices 343 may be in the same or different locations.

Alert 340 may be viewed by operator 342 on graphical user interface 345 on a display device in number of display devices 343. Operator 342 may be, for example, a member of a maintenance crew for aircraft 304, an operator of a handheld scanner used to receive data 322, a pilot, a technician, or some other suitable operator.

In these illustrative examples, operator 342 may initiate number of queries 344 for requested information 346 using graphical user interface 345. As one example, operator 342 may initiate number of queries 344 in response to, for example, alert 340. Tag management module 328 performs number of queries 344 using information 330 to identify requested information 346.

In these depicted examples, tag management module 328 may be configured to generate number of reports 348 containing requested information 346. Further, tag management module 328 may be configured to display number of reports 348 on graphical user interface 345.

In this manner, tag management module 328 is configured to manage plurality of identification devices 308 using information 330. Tag management module 328 may allow management of plurality of identification devices 308 to be automated. In other words, tag management module 328 may identify events 332 without requiring operator input. Further, tag management module 328 allows operator 342 to initiate number of operations 338 for plurality of identification devices 308 without operator 342 needing to process information 330.

Additionally, in some illustrative examples, operator 342 may enter user input 350 using graphical user interface 345. User input 350 may be used in processing information 330 to identify events 332 and/or may be stored as part of information 330.

The illustration of tag management environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, tag management environment 300 may include more than one of aircraft 304. For example, tag management environment 300 may include a fleet of aircraft and/or other vehicles.

Figure 4:
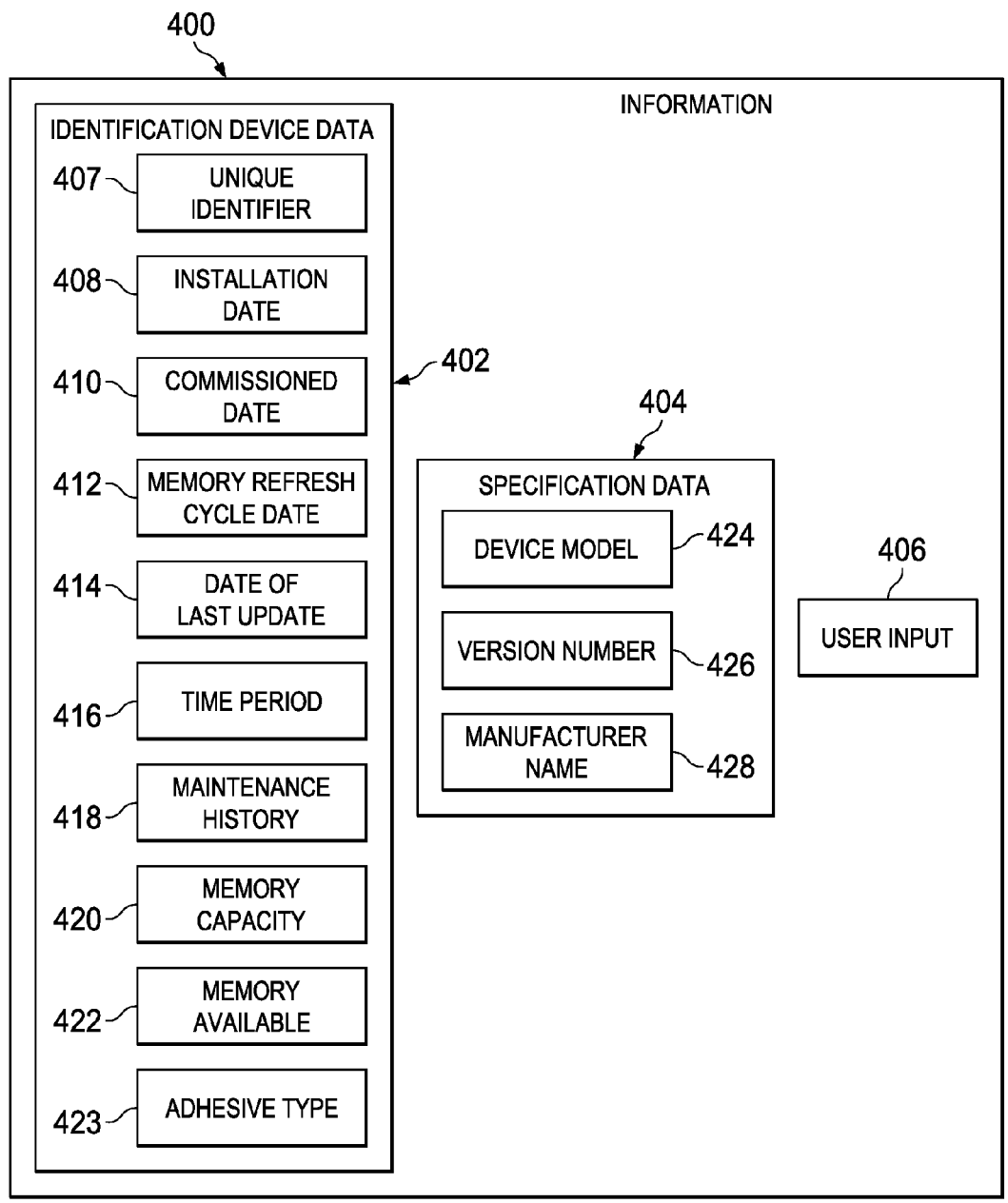
FIG. 4 is an illustration of information for a plurality of identification devices in accordance with an advantageous embodiment.

With reference now to FIG. 4, an illustration of information for a plurality of identification devices is depicted in accordance with an advantageous embodiment. In this illustrative example, information 400 is an example of one implementation for information 330 for plurality of identification devices 308 in FIG. 3.

As depicted, information 400 includes identification device data 402, specification data 404, and user input 406. Identification device data 402 is an example of one implementation for processed data that is formed by processing, for example, data 322 received from each of plurality of identification devices 308 in FIG. 3.

In this illustrative example, identification device data 402 includes unique identifier 407, installation date 408, commissioned date 410, memory refresh cycle date 412, date of last update 414, time period 416, maintenance history 418, memory capacity 420, memory available 422, and/or adhesive type 423 for each identification device from which the data is received.

In this depicted example, unique identifier 407 is an identifier for the identification device that allows the identification device to be distinguished from the other identification devices in the plurality of identification devices. In other words, unique identifier 407 is different for each of the plurality of identification devices.

Installation date 408 is the date on which the identification device is attached to a particular location and/or component. Commissioned date 410 is the date on which the identification device was associated with the component and information 400 was written to the identification device.

Memory refresh cycle date 412 is the date on which identification device data 402 on the memory of the identification device needs to be refreshed. Each memory refresh prolongs the longevity of identification device data 402 on the identification device.

Date of last update 414 is the date on which data was transmitted from the identification device to a computer, such as a handheld reader. Time period 416 is the period of time between date of last update 414 and the date on which data was transmitted from the identification device before date of last update 414. In these illustrative examples, data is not transmitted between these two dates. In other illustrative examples, time period 416 may be the period of time between date of last update 414.

Maintenance history 418 includes information about maintenance performed on the identification device. For example, maintenance history 418 may include a log of dates on which repairs were made to the identification device.

In this illustrative example, memory capacity 420 is the total memory capacity for the identification device. In other words, memory capacity 420 is the total amount of memory available for storing data on the identification device. Memory available 422 is the amount of memory remaining and available for use. In other words, memory available 422 is the memory that is not already in use by the identification device.

Adhesive type 423 includes information about the type of adhesive used to attach the identification device to the component. In these illustrative examples, adhesive type 423 may indicate the adhesive is a thermal adhesive or a conductive adhesive. In other illustrative examples, adhesive type 423 may indicate the adhesive is another type of adhesive and/or the brand name of the adhesive.

In this depicted example, specification data 404 is data about the plurality of identification devices that may be obtained from a number of manufacturers for the plurality of identification devices. For example, specification data 404 may include device model 424, version number 426, manufacturer name 428, and/or other suitable types of specification data.

Device model 424 is the device model for an identification device. Device model 424 may be the same for multiple identification devices. Version number 426 indicates the version of the identification device. Manufacturer name 428 is the manufacturer of the identification device and the provider of specification data 404.

Of course, specification data 404 may include other types of information, such as, for example, a frequency range for an identification device, type of memory, classification, how often an identification device needs to be scanned to retain data, an identification of interchangeable parts for the identification device, security information, temperature restrictions, adhesive restrictions, and/or other suitable types of information.

In this illustrative example, user input 406 includes any input that is entered by an operator for the plurality of identification devices. User input 406 may include, for example, without limitation, corrections to identification device data 402 and/or specification data 404, updates, a query for all the identification devices that have specific specification data 404 such as manufacturer name 428, and/or other suitable types of information.

Figure 5:
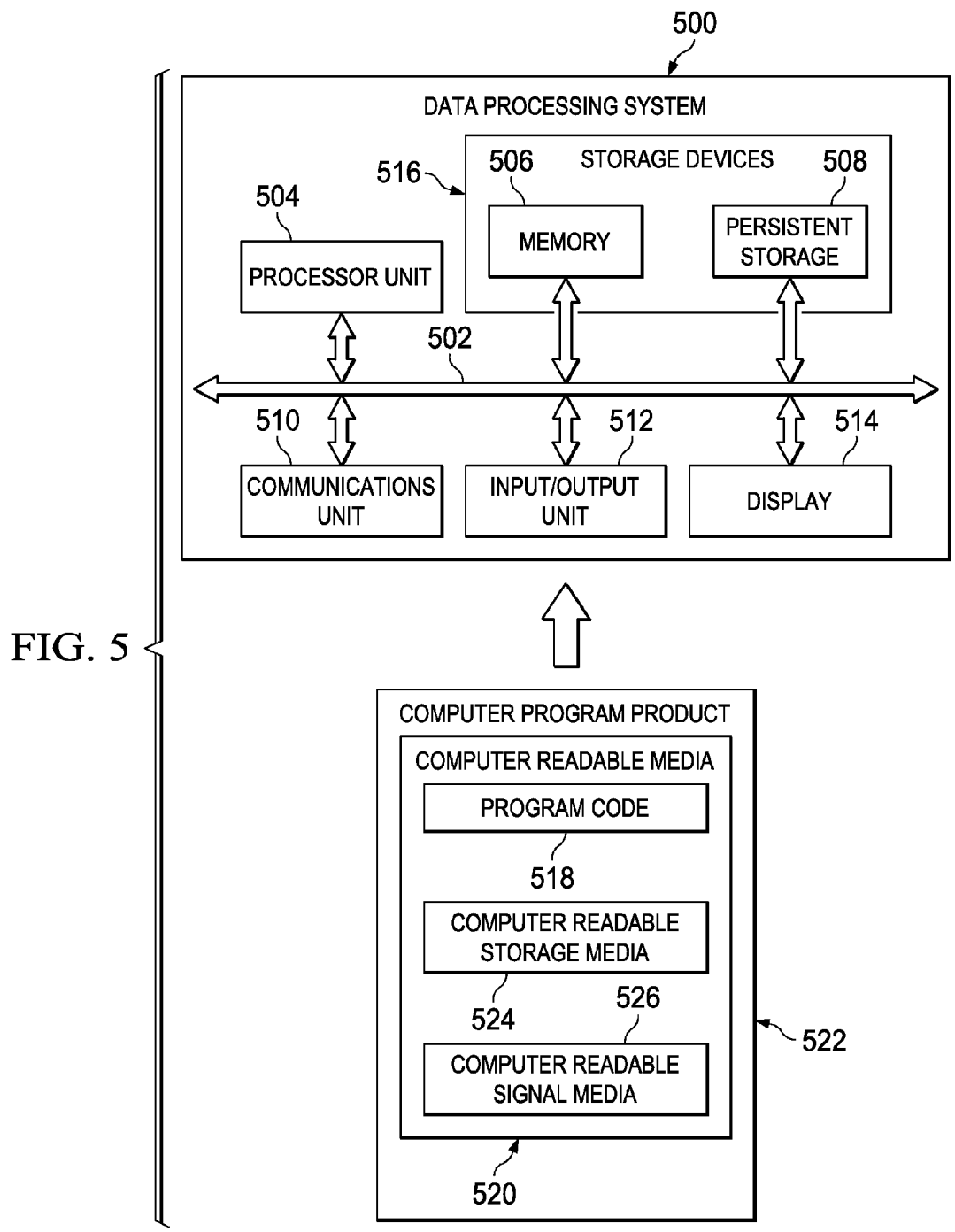
FIG. 5 is an illustration of a data processing system in accordance with an advantageous embodiment.

With reference now to FIG. 5, an illustration of a data processing system is depicted in accordance with an advantageous embodiment. Data processing system 500 is an example of one implementation for a computer in number of computers 326 in computer system 324 in FIG. 3. Data processing system 500 is a computer in which computer usable program code or instructions implementing the processes may be located for the advantageous embodiments.

In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

Alternatively, program code 518 may be transferred to data processing system 500 from computer readable media 520 through a communications link to communications unit 510 and/or through a connection to input/output unit 512. The communications link and/or the connection may be physical or wireless in these illustrative examples. Computer readable media 520 also may take the form of non-tangible media, such as communications links or wireless transmissions containing the program code.

In some advantageous embodiments, program code 518 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different advantageous embodiments may be implemented. The different advantageous embodiments may be implemented in a data processing system including components in addition to or in place of those illustrated for data processing system 500. Other components shown in FIG. 5 can be varied from the illustrative examples shown. The different advantageous embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Figure 6:
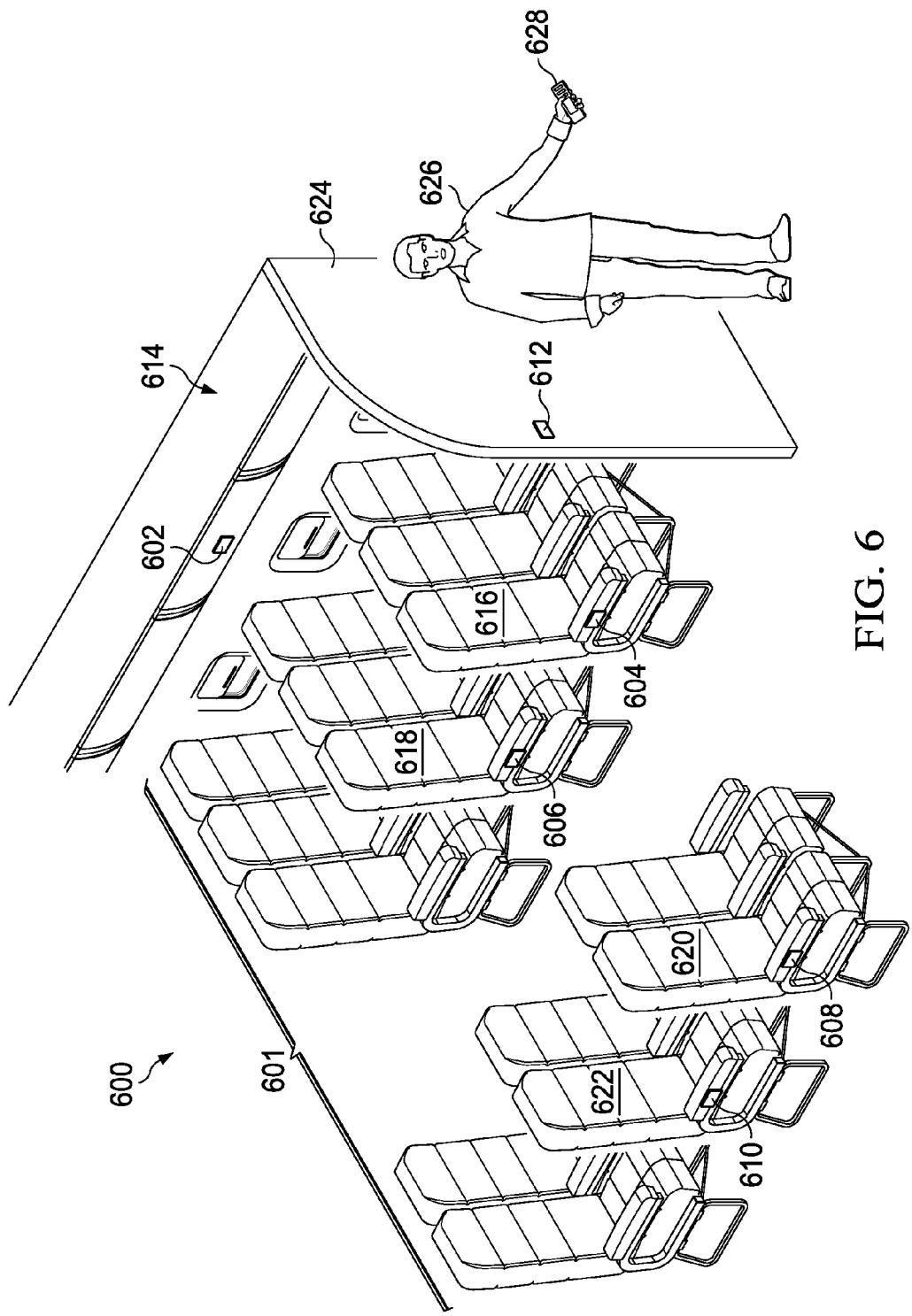
FIG. 6 is an illustration of an inside of an aircraft in accordance with an advantageous embodiment.

With reference now to FIG. 6, an illustration of a portion of an aircraft is depicted in accordance with an advantageous embodiment. In this illustrative example, aircraft 600 is an example of one implementation for aircraft 304 in FIG. 3. The portion of aircraft 600 depicted is a portion of passenger cabin 601 for aircraft 600.

As depicted, aircraft 600 has radio frequency identification tags 602, 604, 606, 608, 610, and 612. Radio frequency identification tags 602, 604, 606, 608, 610, and 612 are examples of implementations for plurality of identification devices 308 in FIG. 3.

In this illustrative example, radio frequency identification tags 602, 604, 606, 608, 610, and 612 are attached to locations on overhead bin 614, seat 616, seat 618, seat 620, seat 622, and wall 624, respectively, on aircraft 600. Radio frequency identification tags 602, 604, 606, 608, 610, and 612 are attached to overhead bin 614, seat 616, seat 618, seat 620, seat 622, and wall 624 to uniquely identify these components on aircraft 600.

As depicted in this example, radio frequency identification tag 604 is attached to a location on seat 616 to uniquely identify seat 616. Of course, in other illustrative examples, additional radio frequency identification tags may be attached to different locations on seat 616 such that the different radio frequency identification tags uniquely identify different portions of seat 616.

In this illustrative example, operator 626 uses handheld reader 628 to obtain data from radio frequency identification tags 602, 604, 606, 608, 610, and 612. Handheld reader 628 may be implemented using data processing system 500 in FIG. 5. Further, handheld reader 628 is a computer configured to receive data that is transmitted from the different radio frequency identification devices.

Additionally, handheld reader 628 may be configured to send the data received from radio frequency identification tags 602, 604, 606, 608, 610, and 612 to a tag management module, such as tag management module 328 in FIG. 3, for processing. In particular, in these examples, the data may be sent using a wireless communications link.

Figure 7:
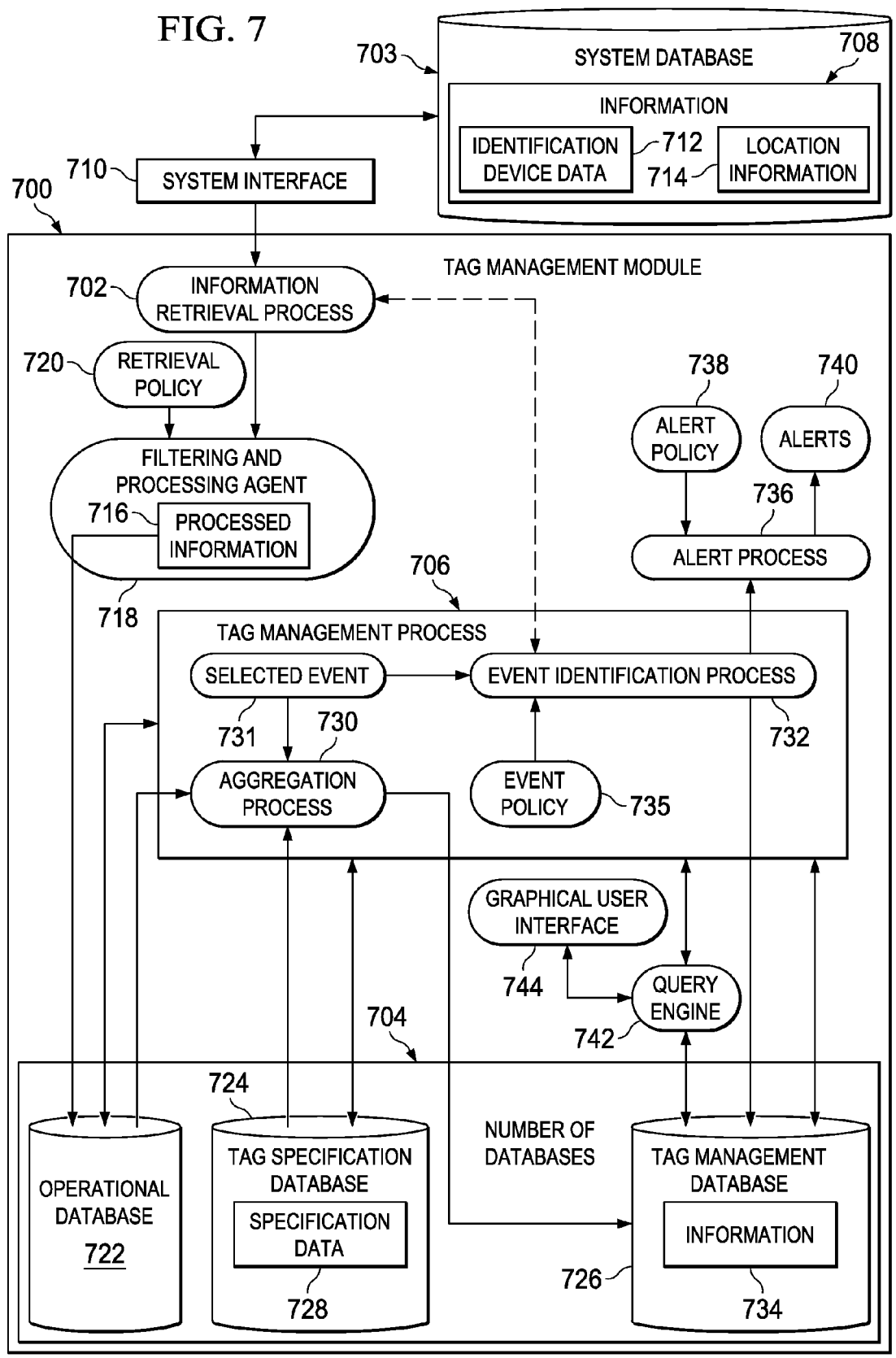
FIG. 7 is an illustration of a tag management module in accordance with an advantageous embodiment.

With reference now to FIG. 7, an illustration of a tag management module is depicted in accordance with an advantageous embodiment. In this illustrative example, tag management module 700 is an example of one implementation for tag management module 328 in FIG. 3. Tag management module 700 is configured to manage tags, such as tags 302 in FIG. 3. In particular, tag management module 700 is configured to manage a plurality of identification devices, such as plurality of identification devices 308 in FIG. 3.

Additionally, tag management module 700 is configured to manage radio frequency identification devices, such as radio frequency identification tags 602, 604, 606, 608, 610, and 612 as well as any other radio frequency identification tags on aircraft 600 as shown in FIG. 6.

As depicted, tag management module 700 includes information retrieval process 702, number of databases 704, and tag management process 706. Information retrieval process 702 is configured to retrieve information 708 from system database 703 using system interface 710. System database 703 is a database that may be managed by an entity, such as, for example, without limitation, an airline, an organization, a maintenance crew, an aircraft owner, or some other suitable type of entity. In this illustrative example, system database 703 may be in a location remote to tag management module 700.

Information 708 in system database 703 includes identification device data 712, location information 714, and/or other suitable information for a number of aircraft. Identification device data 712 may be, for example, identification device data 402 in FIG. 4. Identification device data 712 is data that is obtained from the plurality of identification devices. Location information 714 identifies which identification devices are attached to which locations and/or components on the number of aircraft.

In this illustrative example, information retrieval process 702 processes information 708 to form processed information 716 using filtering and processing agent 718. Filtering and processing agent 718 is configured to use retrieval policy 720 to process information 708.

Retrieval policy 720 includes a number of rules, criteria, and/or guidelines for processing information 708. As one illustrative example, retrieval policy 720 may include a number of guidelines for formatting information 708 received from system database 703 into a desired format for processed information 716.

For example, information retrieval process 702 is configured to retrieve information from system databases for different entities. These different entities may not format their information in the same manner. Filtering and processing agent 718 may use retrieval policy 720 to format the information retrieved from the different system databases.

In some illustrative examples, retrieval policy 720 may include a number of criteria for filtering information 708 such that only a portion of information 708 is used to form processed information 716. In other illustrative examples, retrieval policy 720 may include a number of rules for selecting portions of information 708 to form processed information 716.

As depicted, filtering and processing agent 718 stores processed information 716 in operational database 722 in number of databases 704. Number of databases 704 also includes tag specification database 724 and tag management database 726.

Tag specification database 724 contains specification data 728. Specification data 728 may be, for example, specification data 404 in FIG. 4. Specification data 728 includes specification data obtained from a number of manufacturers for different types of identification devices.

In this illustrative example, tag management process 706 comprises aggregation process 730 and event identification process 732. Aggregation process 730 is configured to retrieve, combine, and process the information stored in operational database 722 and tag specification database 724 to form information 734. Information 734 may be, for example, information 330 in FIG. 3 and/or information 400 in FIG. 4.

In some illustrative examples, aggregation process 730 forms information 734 in response to selected event 731. Selected event 731 may be a periodic event and/or a non-periodic event. For example, without limitation, selected event 731 may be a non-periodic event, such as the receipt of a service bulletin, a notification, user input, or some other non-periodic event. Selected event 731 may be a periodic event, such as a lapse of time or some other suitable periodic event.

Aggregation process 730 stores information 734 in tag management database 726 in number of databases 704. Information 734 may also include other types of information. For example, information 734 may include information formed from processing user input.

In this illustrative example, event identification process 732 in tag management process 706 is configured to identify an occurrence of an event, such as event 336 in FIG. 3, using event policy 735. Event policy 735 may be, for example, event policy 334 in FIG. 3.

Event identification process 732 processes information 734 in tag management database 726 to identify when an event occurs. For example, event identification process 732 may be configured to retrieve information 734 periodically to determine whether an event has occurred. In some illustrative examples, event identification process 732 may be configured to retrieve information 734 in response to user input.

In other illustrative examples, event identification process 732 identifies the occurrence of an event any time that information retrieval process 702 retrieves information 708 from system database 703.

In response to identifying the occurrence of an event, event identification process 732 generates a notification indicating that an event has occurred and information about the event. This notification is sent to alert process 736. Alert process 736 uses alert policy 738 to determine whether or not alerts 740 are to be generated in response to the occurrence of the event. Alert policy 738 may indicate, for example, that an alert needs to be sent to an operator when certain events occur. For example, when the amount of memory on an identification device exceeds a desired threshold, an alert may be sent to an operator to replace the identification device.

In this illustrative example, alerts 740 indicate that a number of operations may need to be performed for a number of identification devices. For example, an alert in alerts 740 may indicate that a radio frequency identification tag needs to be replaced or repaired. A different alert may indicate that an operator needs to use a handheld reader to perform another retrieval of data from an identification device.

In this illustrative example, tag management module 700 also includes query engine 742. Query engine 742 is configured to receive user input for requested information from tag management database 726 entered through graphical user interface 744. In these illustrative examples, graphical user interface 744 may be in a location remote to tag management module 700.

For example, a user may want to generate a report indicating a current status for a plurality of identification devices on a particular aircraft. The user enters user input using graphical user interface 744. Query engine 742 receives the user input and queries tag management database 726 for the requested information.

In response to obtaining the requested information, query engine 742 generates a report containing the requested information. Further, query engine 742 sends the report to graphical user interface 744 for display to the user.

Further, in these illustrative examples, query engine 742 may also be configured to perform queries for the requested information without receiving user input. In other words, query engine 742 may be configured to perform automated queries. In this manner, reports may be generated without requiring user input.

Of course, in other illustrative examples, a user may enter user input using graphical user interface 744 to add additional information to information 734 in tag management database 726. In still other illustrative examples, user input may be entered to change one of retrieval policy 720, event policy 735, and/or alert policy 738.

In these depicted examples, graphical user interface 744 allows a user to have access to all of information 734 in tag management database 726.

Figure 8:
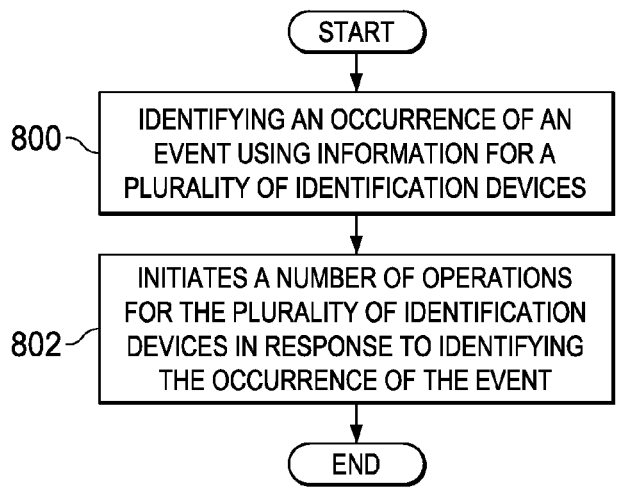
FIG. 8 is an illustration of a flowchart of a process for managing a plurality of identification devices on an aircraft in accordance with an advantageous embodiment.

Turning now to FIG. 8, an illustration of a flowchart of a process for managing a plurality of identification devices on an aircraft is depicted in accordance with an advantageous embodiment. The process illustrated in FIG. 8 may be implemented in tag management environment 300 in FIG. 3. Further, this process may be implemented using tag management module 328 in FIG. 3.

The process begins by identifying an occurrence of an event using information for a plurality of identification devices (operation 800). The plurality of identification devices is a plurality of radio frequency identification devices in this illustrative example.

Each of the plurality of identification devices is associated with a plurality of components on the aircraft. The information for the plurality of identification devices comprises data received from the plurality of identification devices and specification data for the plurality of identification devices.

The process then initiates a number of operations for the plurality of identification devices in response to identifying the occurrence of the event (operation 802), with the process terminating thereafter. The number of operations may include at least one of replacing an identification device, adding the identification device, removing the identification device, and repairing the identification device. Further, the number of operations may include retrieving the data from the plurality of identification devices.

Still further, in operation 802, the process may generate a number of alerts to be displayed to a user indicating that the event has occurred. The user may then perform the number of operations based on the occurrence of the event.

Figure 9:
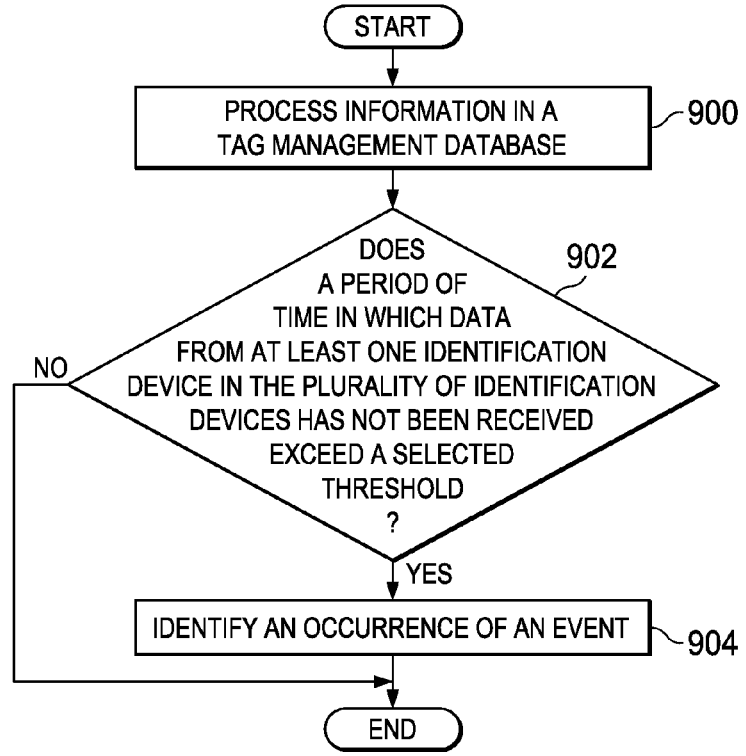
FIG. 9 is an illustration of a flowchart of a process for identifying the occurrence of an event in accordance with an advantageous embodiment.

Turning now to FIG. 9, an illustration of a flowchart of a process for identifying the occurrence of an event is depicted in accordance with an advantageous embodiment. The process illustrated in FIG. 9 may be a more-detailed process for operation 800 in FIG. 8.

The process begins by processing information in a tag management database (operation 900). The tag management database may be, for example, tag management database 726 in FIG. 7. The process then determines whether a period of time in which data from at least one identification device in the plurality of identification devices has not been received exceeds a selected threshold (operation 902).

If the period of time exceeds the threshold, the process identifies an occurrence of an event (operation 904), with the process terminating thereafter. Otherwise, the process terminates.

Figure 10:
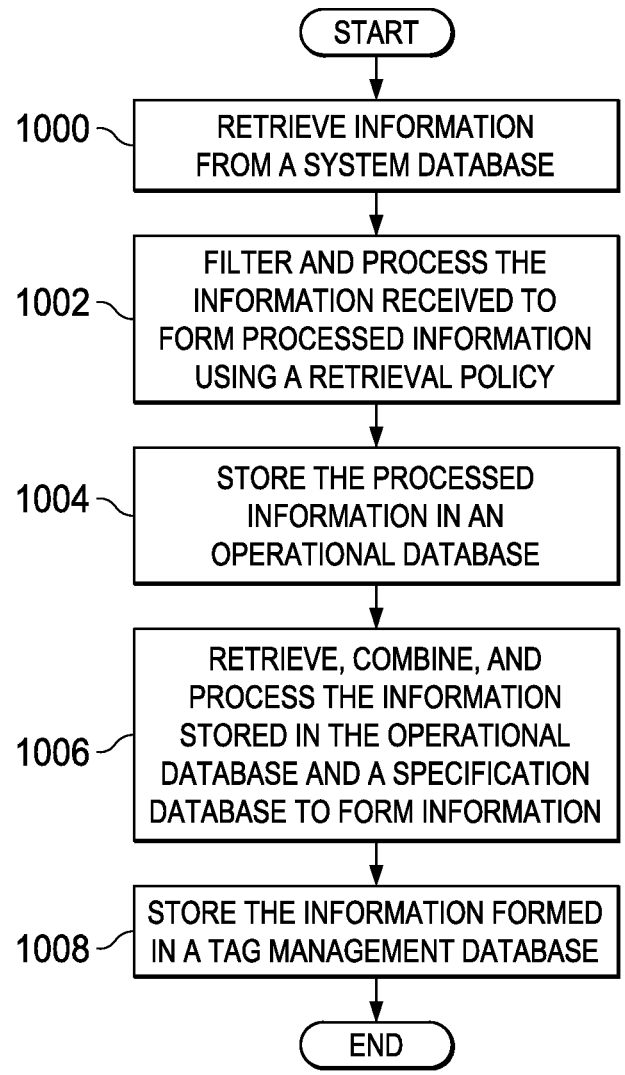
FIG. 10 is an illustration of a flowchart of a process for forming information for a plurality of identification devices in accordance with an advantageous embodiment.

Turning now to FIG. 10, an illustration of a flowchart of a process for forming information for a plurality of identification devices is depicted in accordance with an advantageous embodiment. The process illustrated in FIG. 10 may be implemented using tag management module 328 in FIG. 3 and/or tag management module 700 in FIG. 7.

The process begins by retrieving information from a system database (operation 1000). The system database is managed by an entity owning an aircraft with a plurality of identification devices on the aircraft. The system database contains identification device data, such as identification device data 402 in FIG. 4, and location information. The location information identifies which identification device is attached to which location and/or component on the aircraft.

The process then filters and processes the information received to form processed information using a retrieval policy (operation 1002). Thereafter, the process stores the processed information in an operational database (operation 1004), such as operational database 722 in FIG. 7.

Next, a tag management process retrieves, combines, and processes the information stored in the operational database and a specification database to form information (operation 1006). The specification database is, for example, tag specification database 724 in FIG. 7. The process stores the information formed in operation 1006 in a tag management database (operation 1008), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for managing identification devices on an aircraft. An occurrence of an event is identified using information for a plurality of identification devices. Each of the plurality of identification devices is associated with a plurality of components on the aircraft. The information for the plurality of identification devices comprises data received from the plurality of identification devices and specification data for the plurality of identification devices. In response to identifying the occurrence of the event, a number of operations for the plurality of identification devices are initiated.

The different advantageous embodiments provide for managing a plurality of tags associated with a plurality of aircraft components. By storing data about the plurality of tags and the specifications of those tags, a tag management system may use rules that define when a tag needs to be repaired or replaced.

The different advantageous embodiments may recognize and capture all tags that are not currently in the database and add the new tags to the database. By adding the tags to the database, the tags are then part of the tag management process. The advantageous embodiments may also recognize data that is different between the tag and the database and based on user or otherwise predetermined rules, will update each device accordingly.

The different advantageous embodiments may provide alerts, future alerts and maintenance, the ability to query on specific parameters including, but not limited to, the entire fleet of aircraft, part number, action taken on tag, condition noted of tag, or any information on the tag.

The different advantageous embodiments may provide data management by being able to accomplish updated information of the tags and alert if information on the tag becomes outdated.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different advantageous embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Modems and network adapters are just a few non-limiting examples of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing identification devices on an aircraft, the method comprising:
    identifying, by a processor unit, an occurrence of an event for an identification device in a plurality of identification devices using information about the plurality of identification devices, wherein the plurality of identification devices are associated with a plurality of components on the aircraft and wherein the information about the plurality of identification devices comprises data about the plurality of identification devices that is stored on the plurality of identification devices and that is received from the plurality of identification devices and specification data about the plurality of identification devices; and
    responsive to identifying the occurrence of the event, generating, by the processor unit, a notification to a user that indicates an operation to be performed, wherein the operation is selected from replacing the identification device, removing the identification device, and repairing the identification device.

2. The method of claim 1, wherein the plurality of identification devices is a plurality of radio frequency identification devices.

3. The method of claim 1 further comprising:
    attaching the plurality of identification devices to a plurality of locations on the plurality of components on the aircraft.

4. The method of claim 1 further comprising:
    receiving the data about the plurality of identification devices from the plurality of identification devices using radio frequency signals.

5. The method of claim 1 further comprising:
    obtaining the specification data about the plurality of identification devices from a manufacturer of the plurality of identification devices.

6. The method of claim 1 further comprising:
    attaching the plurality of identification devices on the plurality of components during at least one of prior to installing the plurality of components on the aircraft and after installing the plurality of components on the aircraft.

7. The method of claim 1, wherein the event is a period of time in which data is not received from the identification device in the plurality of identification devices that exceeds a selected threshold.

8. The method of claim 1, wherein the data about the plurality of identification devices comprises memory available for the identification device and wherein the event is the memory available for the identification device being less than a selected threshold.

9. The method of claim 1, wherein the event is a version of the identification device in the plurality of identification devices expiring.

10. The method of claim 1 further comprising:
    generating, by a processor unit, an alert for display indicating that the event has occurred.

11. The method of claim 1 further comprising:
    performing a number of queries to retrieve requested information from the information without requiring user input; and
    generating a number of reports in response to retrieving the requested information.

12. The method of claim 1, wherein the plurality of identification devices comprises at least one of a radio frequency identification device, an optical memory card, a barcode, and a magnetic strip.

13. An apparatus comprising:
    a plurality of identification devices associated with a plurality of components on an aircraft; and
    a computer system configured to identify an occurrence of an event for an identification device in the plurality of identification devices using information about the plurality of identification devices, wherein the information about the plurality of identification devices comprises data about the plurality of identification devices that is stored on the plurality of identification devices and that is received from the plurality of identification devices and specification data about the plurality of identification devices; and generate a notification to a user that indicates an operation to be performed in response to identifying the occurrence of the event, wherein the operation is selected from replacing the identification device, removing the identification device, and repairing the identification device.

14. The apparatus of claim 13, wherein the plurality of identification devices is a plurality of radio frequency identification devices.

15. The apparatus of claim 13, wherein the plurality of identification devices is attached to a plurality of locations on the plurality of components on the aircraft.

16. The apparatus of claim 13, wherein the computer system is configured to receive the data about the plurality of identification devices from the plurality of identification devices using radio frequency signals.

17. The apparatus of claim 13, wherein the computer system is configured to obtain the specification data about the plurality of identification devices from a number of manufacturers for the plurality of identification devices.

18. The apparatus of claim 13, wherein the event is a period of time in which data is not received from the identification device in the plurality of identification devices that exceeds a selected threshold.

19. The apparatus of claim 13, wherein the data about the plurality of identification devices comprises memory available for the identification device and wherein the event is the memory available for the identification device being less than a selected threshold.

20. The apparatus of claim 13, wherein the event is a version of the identification device in the plurality of identification devices expiring.

21. The apparatus of claim 13, wherein the computer system is configured to generate an alert for display indicating that the event has occurred.

22. The apparatus of claim 13, wherein the computer system is further configured to perform a number of queries to retrieve requested information from the information without requiring user input; and generate a number of reports in response to retrieving the requested information.

23. The apparatus of claim 13, wherein the plurality of identification devices comprises at least one of a radio frequency identification device, an optical memory card, a barcode, and a magnetic strip.

24. A method for managing radio frequency identification devices on an aircraft, the method comprising:
- identifying, by a processor unit, an occurrence of an event for a radio frequency identification device in a plurality of radio frequency identification devices using information about the plurality of radio frequency identification devices, wherein the plurality of radio frequency identification devices are associated with a plurality of components on the aircraft and wherein the information about the plurality of radio frequency identification devices comprises data about the plurality of radio frequency identification devices that is stored on the plurality of radio frequency identification devices and that is received from the plurality of radio frequency identification devices and specification data about the plurality of radio frequency identification devices; and
- responsive to identifying the occurrence of the event, generating, by the processor unit, a notification to a user that indicates an operation to be performed, wherein the operation is selected from replacing the identification device, removing the identification device, and repairing the identification device.

* * * * *